SOLID STATE TEMPERATURE MEASURING DEVICE

Original Filed July 12, 1965 2 Sheets-Sheet 1

INVENTORS
KARABET SIMONYAN
GEORGE E. CHILTON
BY
Leonard H. King
ATTORNEY.

SOLID STATE TEMPERATURE MEASURING DEVICE

Original Filed July 12, 1965 2 Sheets-Sheet 2

INVENTORS
KARABET SIMONYAN
GEORGE E. CHILTON
BY
Leonard H. King
ATTORNEY.

United States Patent Office

Re. 27,458
Reissued Aug. 15, 1972

27,458
SOLID STATE TEMPERATURE MEASURING DEVICE

Karabet Simonyan, Saddle Brook, and George E. Chilton, Haworth, N.J., assignors to Computer Diode Corporation, Fair Lawn, N.J.

Original No. 3,330,158, dated July 11, 1967, Ser. No. 471,298, July 12, 1965, which is a continuation of Ser. No. 817,260, Apr. 10, 1969. Application for reissue Mar. 4, 1970, Ser. No. 19,619
Int. Cl. G01k 7/22
U.S. Cl. 73—362 SC 10 Claims

Matter enclosed in heavy brackets [ ] appears in the original patent but forms no part of this reissue specification; matter printed in italics indicates the additions made by reissue.

*ABSTRACT OF THE DISCLOSURE*

*A temperature-measuring detector having a plurality of like, similarly oriented, series-connected semiconductor junctions, arranged in direct electrical and mechanical contact to form a two-terminal element. The two-terminal element provides linear forward voltage versus environmental temperature characteristics. This element is particularly useful in bridge-type temperature-measuring circuits such as for the measurement of absolute temperatures.*

*This is a streamline continuation of reissue application Ser. No. 817,260, filed Apr. 10, 1969, and now abandoned.*

This invention relates to a solid state temperature measuring device.

Silicon diode elements have a negative-voltage temperature characteristic when positively biased. It is generally accepted that this is a problem the circuit designer must live with and compensate for. As will be disclosed hereinafter, this temperature-voltage characteristic can be utilized in a temperature measuring device which is substantially linear over a broad range. For example, devices made in accordance with the invention, when tested in the range of −65° to 200° C. have proven to have a linear characteristic. Aside from the desirable linearity characteristic, another advantage of the apparatus of this invention is that it may be made extremely small; for example, not much larger than the head of a pin. Thus it would have low mass and may be used to sense the temperature of environments without disturbing the equilibrium. Further, the sensor can be located remotely from the temperature indicator.

Accordingly, it is an object of this invention to provide a subminiature temperature sensing element.

Another object of this invention is to provide a simple temperature measuring apparatus which is linear over a broad temperature range.

A particular object of this invention is to provide a simple temperature sensing element and apparatus which is linear over the range −65° C. to 200° C.

A further object is to provide an improved temperature measuring device having low current requirements.

Still another object is to provide an improved solid state temperature measuring device which is independent of nominal power supply variations.

These and other features, objects and advantages of the invention will, in part, be pointed out with particularity and will, in part, become obvious from the following more detailed description of the invention taken in conjunction with the accompanying drawing which forms an integral part thereof.

In the various figures of the drawing, like reference characters designate like parts.

Figure 1:
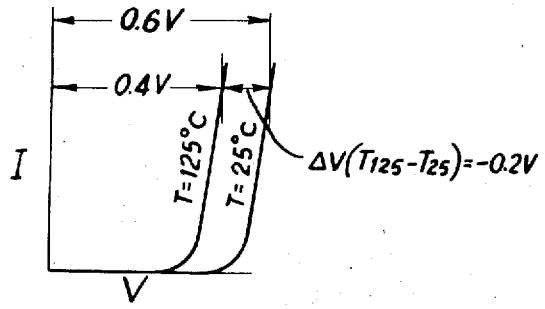
FIG. 1 is a graphical representation of a family of current-versus-voltage curves for a given silicon diode at various temperatures.

Referring now to FIG. 1, there is shown a pair of voltage-current curves for a silicon diode. For a typical silicon diode the change in voltage, per degree C. change in temperature at a given current, is approximately −2 mv. Thus for a hundred degree difference in temperature, a change of approximately −0.2 v. is obtained.

Figure 2:
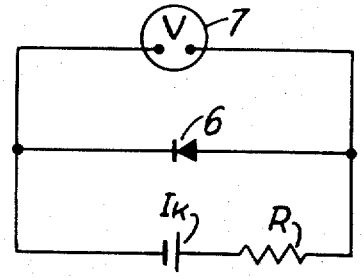
FIG. 2 is a schematic showing of a simple prior art temperature measuring circuit.

By placing an n number of diodes in series, the voltage change is multiplied n times. Thus for ten diodes in series in the circuit, a 10-degree change in temperature of the sensing diodes would produce an −0.2 v. change in the reading of the voltmeter 7. Thus if, as shown in FIG. 2, a diode 6 were connected to a constant current source $I_k$ through a dropping resistor R, then as the temperature of the diode pack 6 was varied, the reading on microvoltmeter 7 would vary proportionately to provide an indication of the relative change in the sensed temperature. However, this simple circuit is not suited for practical applications.

Figure 3:
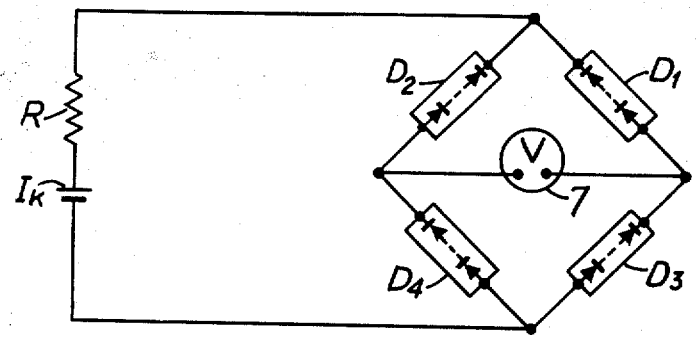
FIG. 3 is a schematic showing of the apparatus of this invention arranged for measuring absolute temperatures.
Figure 6:
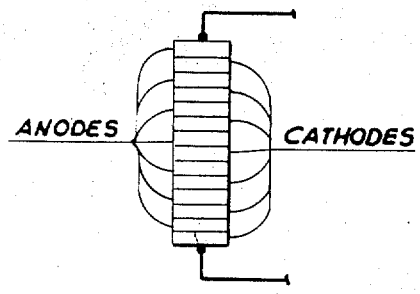
FIG. 6 is a greatly enlarged view in elevation of a diode pack.

The diode packs may be made by assembling a number of diodes in anode-to-cathode series connection, as shown in FIG. 6. The diode packs may be manufactured so as to be closely matched in temperature-voltage characteristics.

Where it is desired to measure absolute temperature, the circuit of FIG. 3 is employed. Diode packs $D_1$, $D_2$, $D_3$ and $D_4$ are set up as arms of a bridge and packs $D_2$ and $D_3$ are maintained at a known temperature. It will be noted that since the series impedance is the same in branches of $D_1$ and $D_3$ and branches of $D_2$ and $D_4$, the currents are the same, and the functioning of the circuit is therefore independent of variation in current. The device may operate with a current drain of about 100 $\mu$a. making battery operation feasible.

The voltage measured by voltmeter 7 will therefore be the voltage drop across the diodes or diode packs in accordance with the following equation:

$$v=(v_1-v_2)-(v_4-v_3)$$

where the respective voltages correspond to the voltage across the corresponding diode packs. Since the voltage is directly proportional to the temperature difference, the voltmeter scale may be calibrated directly in degrees.

Figure 4:
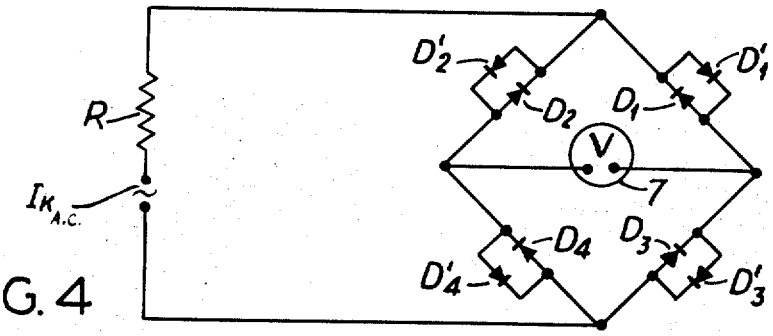
FIG. 4 is a schematic diagram of an apparatus for operation from an A.C. source.

In FIG. 4, there is disclosed an A.C. operated version of the device. The bridge circuit is connected to A.C. source $I_{K_{A.C.}}$ Each of the diodes or diode packs $D_1$–$D_4$ has parallel to it, a like diode pack $D_1^1$–$D_4^1$, respectively, arranged in the opposite direction. Thus, either the $D_1$–$D_4$ or the $D_1^1$–$D_4^1$ diode packs will be operating depending on the polarity of the applied potential.

Figure 5:
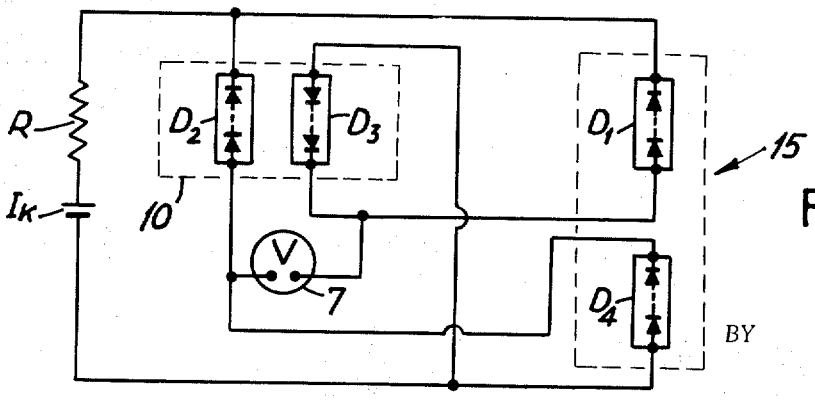
FIG. 5 is a schematic showing of the apparatus with the components arranged for the remote indication of a sensed temperature.

In the practical circuit shown in FIG. 5, banks of diodes $D_1$ and $D_4$ are located in the environment whose temperature is to be sensed. On the other hand, the reference banks, namely, $D_2$ and $D_3$, are located in an environment 10 of known temperature. This, for example, may be an oven or an ice bath. The two reference banks may be in a single bead. If desired, the temperature of the reference junction may be measured by a thermometer and the reading on voltmeter 7 converted to a measured temperature reading by means of a conventional calibation chart.

As one example of the utility of the devices, its application to the taking of human temperatures may be considered. It is contemplated that the device be slipped into a disposable plastic or metal sleeve 12 made out of aluminum foil or polyethylene film, say, but a mil thick. Using this device, a nurse could go through a ward in a matter of minutes taking temperatures of patients almost instantaneously and merely discarding the protective film sheath without the need for sterlization of thermometers and avoiding the dangers of cross infection involved in the present system.

Figure 7:
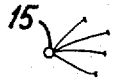
FIG. 7 is a pictorial view of the temperature sensing element of this invention.

In FIG. 7, a typical bead 15 containing two diode packs electrically insulated from each other is shown in full size. The aparatus is sufficiently small to be passed into human body orifices by means of a catheter for monitoring purposes.

The sensing portion of the apparatus is sufficiently small as to be contained within a small bead of material. A presently preferred material for the bead is an epoxy resin filled with a metal powder to render it thermally conductive but electrically insulated.

Figure 8:
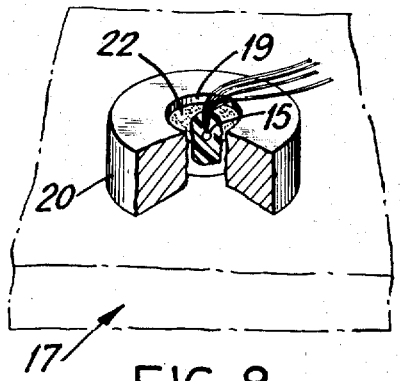
FIG. 8 is an enlarged pictorial view of a magnetically secured temperature sensing element.

In FIG. 8, a temperature sensing device suited for sensing temperature of a magnetic material 17 is disclosed. Here, the sensing device 15, forming the two bridge arms are $D_1$ and $D_4$ shown embedded in the bore 19 of a small disc magnet 20 and retained therein by metal filled epoxy resin potting compound 22. Typically, the device is but ¼" in diameter and ⅛" thick.

Figure 9:
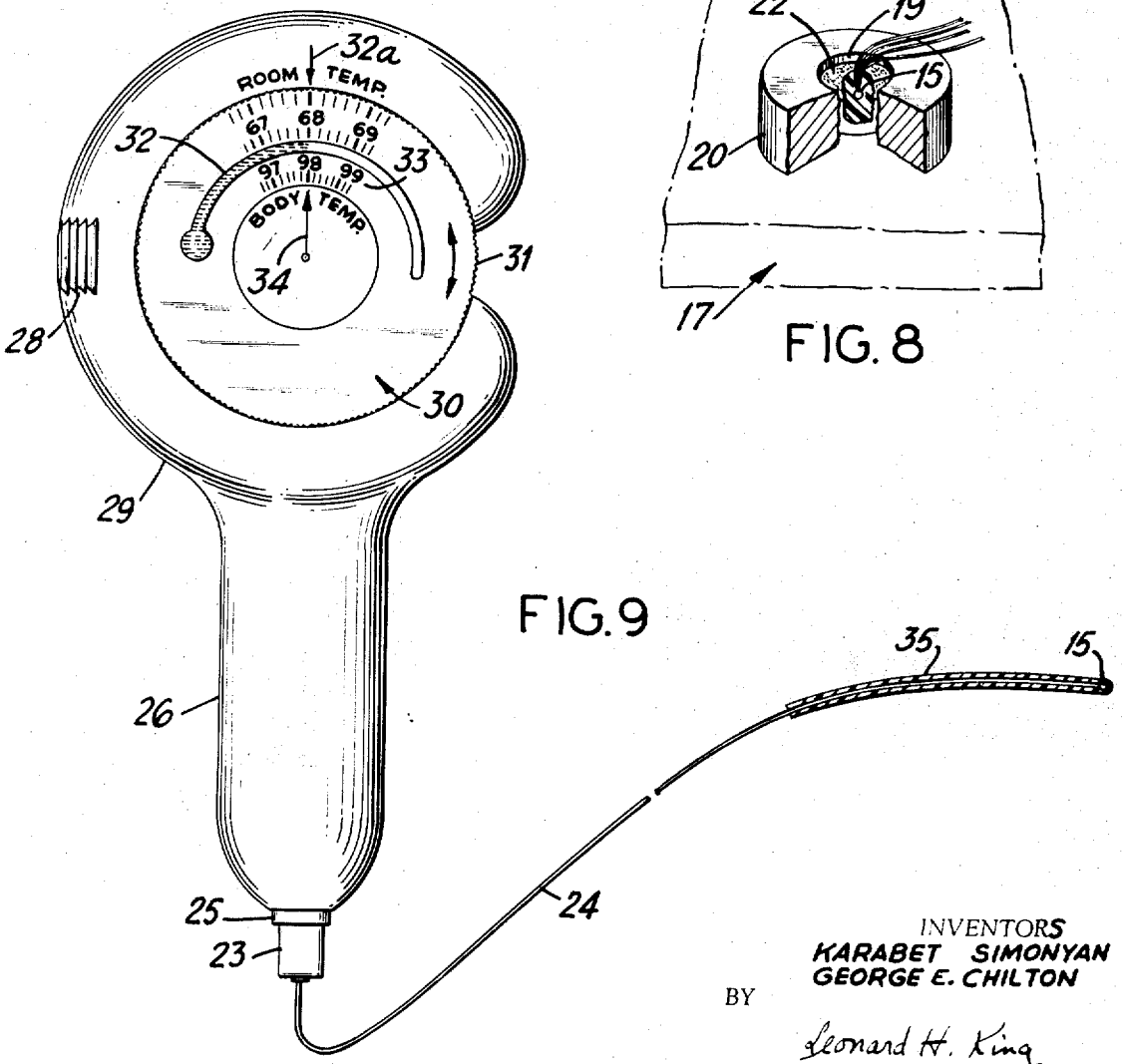
FIG. 9 is a pictorial view of a temperature measuring device.

Since the meter 7 will indicate the difference in temperature between the sensing diodes and the reference diodes, a simple movable dial may be provided to set the scale to read correctly for a range of reference temperatures. An arrangement of this type is shown in FIG. 9. Reference diode packs $D_2$ and $D_3$ are located in a ventilated chamber provided with louvers 28 of housing 29. Within the housing is located a battery $I_K$ and resistor R. Plug 23 of cable 23 mates with jack 25 in handle 26 to connect sensing diode packs $D_1$ and $D_4$ to the other components in accordance with the circuit shown in FIG. 5.

Dial plate 30 is rotated by thumb wheel 31 to permit the user to set the room temperature against indicia 32 as shown by mercury or other expansible fluid thermometer 32 and simultaneously move the voltmeter scale 33 of voltmeter 34 to the proper position. Disposable sheath 12 is shown positioned over encapsulated diode package $D_1$ and $D_4$.

The low current requirement permits the use of small diameter wire leads and also minimizes heating of the semiconductors so that the measured temperature is that of the environment. It should be noted that the internal heating is the same in all four arms and therefore is self-canceling assuring accuracy.

There has been disclosed heretofore the best embodiments of the invention presently contemplated and it is to be understood that various changes and modifications may be made by those skilled in the art without departing from the spirit of the invention.

What is claimed is:

1. A linear solid state temperature detector comprising a temperature responsive bridge having:
   (a) a first pair of diagonally opposed input terminals for connection to a source of potential;
   (b) a second pair of diagonally opposed output terminals providing means for deriving an output current indicative of bridge unbalance;
   (c) current measuring means connected to said output terminals;
   (d) a first bridge arm connected between one of said pair of input terminals and one of said output terminals;
   (e) a second bridge arm connected between the other of said input terminal and said one of said output terminals;
   (f) a third bridge arm connected between the other said output terminal and said one of said input terminals;
   (g) a fourth bridge arm connected between the said other output terminal and the said other input terminal;

wherein each of said bridge arms is composed of a like plurality of like semiconductor junctions, similarly oriented relative to said first pair of output terminals, and each of said arms being characterized by substantially identical temperature vs. voltage characteristics, at least one of said bridge arms being positioned in the environment the temperature of which is to be measured.

2. The detector of claim 1 including a second set of bridge arms connected in parallel with each of said first, second, third and fourth bridge arms, which define a first set of bridge arms, and second set being similar to said first set but each of said junctions being oriented opposite to those of said first set.

3. The detector of claim 1 wherein the semiconductors of one bridge *arm* and the semiconductors of the bridge arm between the input and output terminals not common to said one arm are both in a common environment for sensing a temperature condition and the other bridge arms are maintained in an environment subjected to the same reference temperature, whereby said current measured by said current measuring means is indicative of the difference in temperature between the reference temperature and a sensed temperature condition.

4. In combination with the temperature detector of claim 3,
   (a) independent means to determine the reference temperature; and
   (b) means to indicate the sum of the reference temperature and the temperature difference indicated by said current measuring means, said sum being the sensed temperature.

5. The apparatus of claim 3 wherein said bridge arms for sensing said temperature condition are in a thermally conductive common package connected by conductive leads to the balance of the bridge circuit.

6. The apparatus of claim 5 wherein said common thermally conductive package is covered by a thermally conductive disposable sheath.

7. The apparatus of claim 5 wherein said common package is secured to a magnet.

8. The apparatus of claim 5 including an annular magnet and an electrically nonconductive, thermally conductive plastic core surrounded by said magnet, said common package being embedded in said plastic core.

9. The apparatus of claim 1 wherein each of said arms is composed of a multiple series stack of semiconductor junctions wherein each intermediate anode member is in direct mechanical and electrical contact with a pair of cathode members.

*10. In a temperature detector of the type having a bridge circuit arrangement wherein the voltage developed across an arm of the bridge varies linearly with environmental temperature to provide a measure of said environmental temperature from the bridge output, the improvement which comprises a two-terminal element in each bridge arm, said element having a plurality of like, similarly-oriented semiconductor junctions arranged to form a set of serially connected junctions, each junction having a cathode and an anode, each cathode of a junction being in direct electrical and mechanical contact with a respective adjacent anode, said element being characterized by environmental temperature versus forward voltage characteristics, said voltage characteristics being dependent on the number of junctions in the set.*

References Cited

The following references, cited by the Examiner, are of record in the patented file of this patent or the original patent.

UNITED STATES PATENTS

| | | | |
|---|---|---|---|
| 3,052,124 | 9/1962 | Averitt | 73—362 R |
| 3,176,161 | 3/1965 | Vertrees | 307—310 X |
| 3,271,660 | 9/1966 | Hilbiber | 307—310 X |
| 3,281,656 | 10/1966 | Noble | 323—75 F |
| 2,533,286 | 12/1950 | Schmitt | 73—362 X |
| 2,938,385 | 5/1960 | Mack et al. | 73—362 |
| 3,079,484 | 2/1963 | Shockley et al. | 307—88.5/23.2 |

OTHER REFERENCES

Transitron Corp. Bulletin: TE-1332, June 1964.

LOUIS R. PRINCE, Primary Examiner

F. SHOON, Assistant Examiner

U.S. Cl. X.R.

73—342; 307—310; 323—75 F